US004001556B2

United States Statutory Invention Registration [19]

[11] Reg. Number: H1556

Noel

[45] Published: Jul. 2, 1996

[54] INVENTED POWER & FREE CONVEYOR CARRIER TROLLEY WHEEL DETECTION DEVICE

[75] Inventor: Phares A. Noel, Detroit, Mich.

[73] Assignee: Chrysler Corporation, Auburn Hills, Mich.

[21] Appl. No.: 457,419

[22] Filed: Jun. 1, 1995

[51] Int. Cl.[6] ..... B61B 3/00

[52] U.S. Cl. ..... 104/172.4; 246/169 R

[58] Field of Search ..... 246/169 R; 104/172.4

[56] References Cited

U.S. PATENT DOCUMENTS

| | | | |
|---|---|---|---|
| 3,558,875 | 1/1971 | Gieskieng | 246/169 R |
| 4,245,562 | 1/1981 | Knudsen | 104/172.4 |
| 4,702,104 | 10/1987 | Hallberg | 246/169 R |
| 4,936,529 | 6/1990 | Maine | 246/169 R |
| 5,133,521 | 7/1992 | Gutauskas | 246/169 R |
| 5,368,260 | 11/1994 | Izbinsky et al. | 246/169 R |

OTHER PUBLICATIONS

Noel et al., "Detection of Defective Carrier Trolleys Utilizing a PLC Realizing a Sequential Finite State Machine for Pattern Recognition", IEEE Publication CH3381–Jan. 1993, pp. 48–51.

*Primary Examiner*—Harold J. Tudor

[57] ABSTRACT

In a power and free conveyor system that includes a trolley frame having spaced pairs of load wheels supporting the trolley frame for movement in a longitudinal direction along a track and a spaced pair of guide wheels for maintaining orientation of the frame with respect to the center of the track, a system for monitoring operative condition of the trolley load and guide wheels. A pair of first sensors are respectively disposed on opposed sides of the track and responsive to sequential passage of a corresponding pair of load wheels for generating first electrical signal patterns as a function thereof. A plurality of second sensors are mounted adjacent to the track and responsive to passage of the pair of guide wheels for generating second electrical signal patterns as a function thereof. A fundamental mode asynchronous machine performs pattern recognition analysis on the first and second signal patterns to determine operative condition of the load and guide wheels in real time.

1 Claim, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

INVENTED POWER & FREE CONVEYOR CARRIER TROLLEY WHEEL DETECTION DEVICE

The present invention relates to trolley conveyors, and more particularly to a system for monitoring integrity of trolley frame load and guide wheels.

BACKGROUND AND SUMMARY OF THE INVENTION

So-called power and free conveyor systems play a major role in automotive and other manufacturing facilities for transport of heavy components and assemblies. Conveyors of this type include trolley frames having spaced pairs of load wheels supporting the carrier for longitudinal motion along a track, and a spaced pair of guide wheels for engaging the track and maintaining orientation of the trolley frame with respect to the center of the track. Missing or damaged load or guide wheels can cause the trolley to become jammed in the track, resulting in significant downtime for maintenance and repair. In automotive paint system applications, for example, jamming of a trolley carrier within a paint oven not only results in significant downtime while waiting for the oven to cool, but also can significantly increase the scrap rate of components and parts in the paint preparation process upstream of the oven.

It is therefore a general object of the present invention to provide a system for monitoring the integrity of the load and guide wheels on a trolley frame during operation of the conveyor system to indicate missing or damaged wheels in real time, and thereby help prevent conveyor downtime in a mass production manufacturing environment.

A trolley conveyor system includes a trolley frame which has spaced pairs of load wheels supporting the trolley frame for movement in a longitudinal direction along a track and a spaced pair of guide wheels to maintain alignment of the trolley with respect to the center of the track. The present invention provides a system for monitoring operative condition of the trolley carrier load and guide wheels. A pair of first sensors are respectively disposed on opposed sides of the track, and are responsive to sequential passage of a corresponding pair of load wheels for generating first electrical signal patterns as a function thereof. A plurality of second sensors are mounted adjacent to the track and responsive to passage of the pair of guide wheels for generating second electrical signal patterns as a function thereof. A fundamental mode asynchronous machine performs pattern recognition analysis on the first and second signal patterns to determine operative condition of the load and guide wheels in real time.

BRIEF DESCRIPTION OF THE DRAWING

The invention, together with additional objects, features and advantages thereof, will be best understood from the following description, the .appended claims and the accompanying drawing in which:

DETAILED DESCRIPTION OF PREFERRED EMBODIMENT

Figure 1:
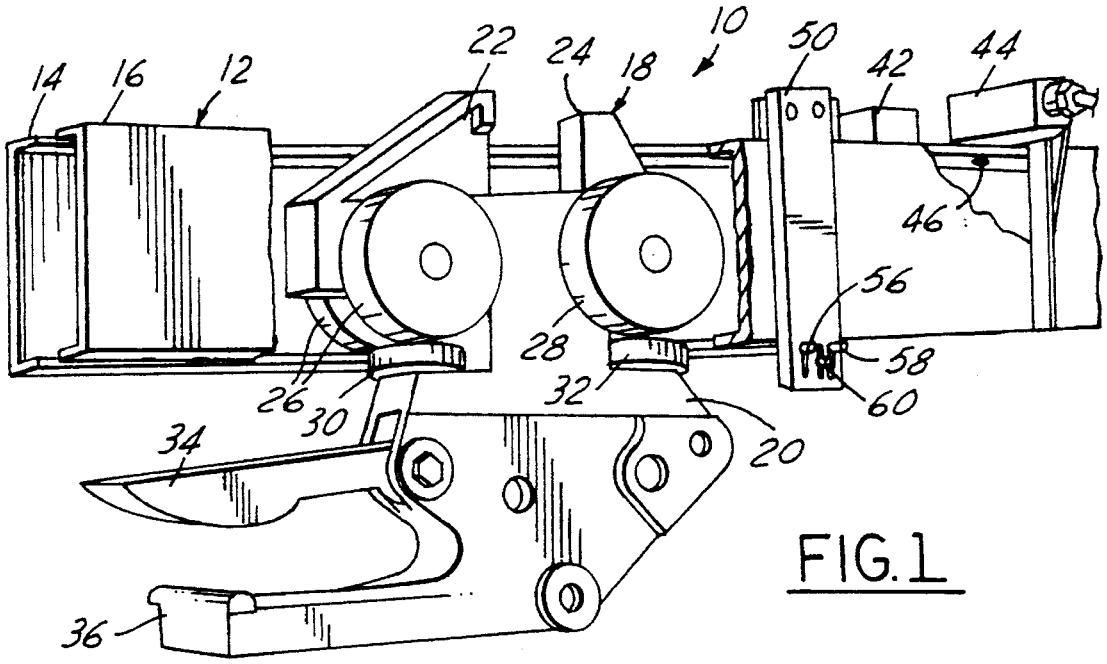
FIG. 1 is a fragmentary perspective view of a trolley conveyor and a trolley frame with load and guide wheel integrity sensors in accordance with a presently preferred embodiment of the invention.

FIG. 1 illustrates a conveyor system 10 comprising a track 12 formed by a pair of opposed parallel C-shaped elongated rails sections 14,16. Track rails 14,16 are mounted or suspended from appropriate support structure (not shown) so as to form a path for longitudinal movement of a plurality of trolleys, one of which is illustrated at 18. Trolley 18 comprises a frame 20 having dogs 22,24 to engage a drive chain or the like. A pair of longitudinally spaced vertical rollers or wheels 26,28 are disposed on each lateral side of frame 20 in laterally aligned pairs for supporting trolley frame 20, and the load carried thereby, from opposed rails 14,16 of track 12. A pair of longitudinally horizontally spaced guide wheels 30,32 are carried by trolley frame 20 for engagement with the lower edges of track rails 14,16 for maintaining orientation of the trolley with respect to the track. A lever 34 cooperates with a bumper 36 suspended from frame 20 to disengage the trolley from the power chain when the unit contacts a preceding trolley.

Figure 2:
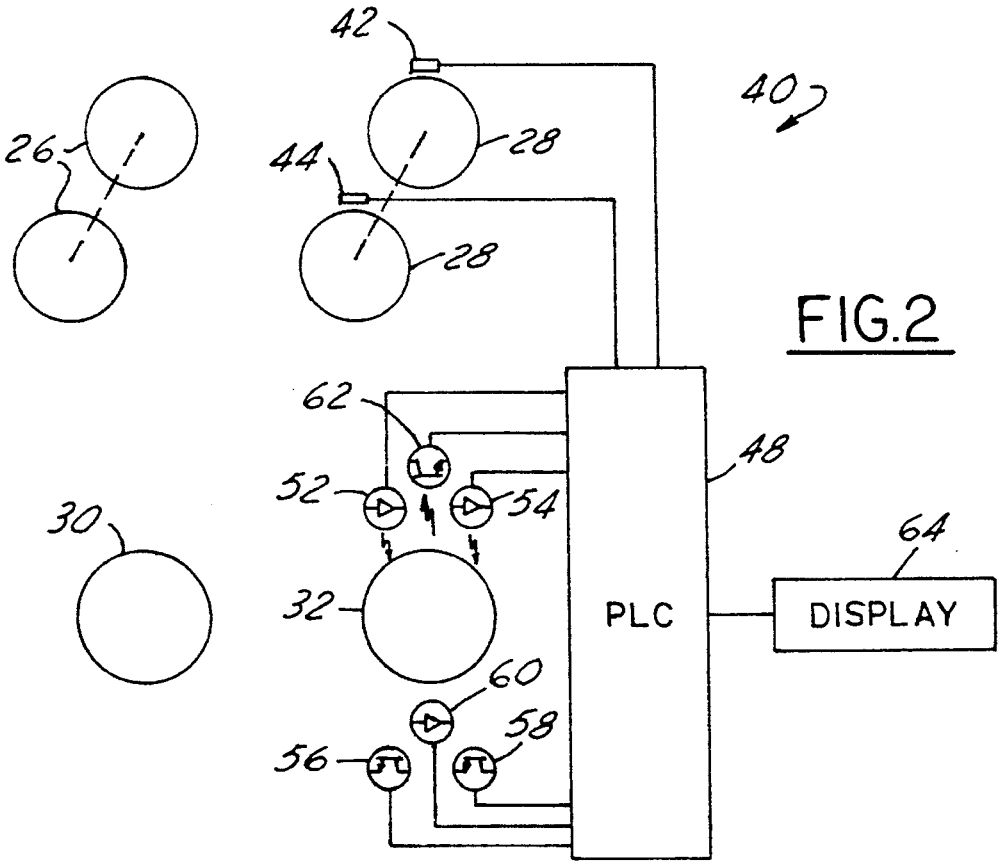
FIG. 2 is a functional block diagram of a trolley load and guide wheel monitoring system in accordance with a presently preferred embodiment of the invention.

A system 40 for monitoring integrity of trolley load wheels 26,28 and trolley guide wheels 30,32 in accordance with the present invention is schematically illustrated in FIG. 2. A pair of inductive sensors 42,44 (FIGS. 1 and 2) are mounted on respective rails 14,16 of track 12. A cut-out or window 46 in each rail 14,16 provides access for respective sensors 42,44 to the track interior, so that the respective sensors 42,44 generate first electrical signal patterns as load wheels 26,28 pass in sequence beneath each sensor. These first electrical signals are fed from sensors 42,44 to a programmable logic controller or PLC 48.

Three light transmitter/receiver pairs are mounted on laterally aligned parallel brackets 50 affixed to track 12 for monitoring passage of trolley carrier guide wheels 30,32. More specifically, a pair of LED transmitters 52,54 are mounted by a plate 50 on one side of track 12 and aligned with a corresponding pair of photosensor receivers 56,58 mounted by a plate 50 on the opposing side of track 12. A third LED transmitter 60 is positioned between photosensors 56,58, and a third photosensor 62 is positioned between LED transmitters 52,54 in alignment with transmitter 60 on the opposing side of the track. The transmitter/receiver pairs 52,56, 60,62 and 54,58 are positioned as shown in FIG. 1 to view across the bottom of track 12 at an orientation lateral to the direction of motion of trolley carrier 18 along track 12, and at a position so that guide wheels 30,32 pass in sequence between the transmitter/receiver pairs. As best seen in FIG. 1, the transmitter/receiver pairs are vertically staggered, which provides a wider detector field of view and reduces crosstalk among the transmitter/receiver pairs. The transmitter/receiver mounting openings in plates 50 are vertically elongated to facilitate such vertically staggered configuration and to facilitate alignment of the laterally opposed transmitter/receiver pairs. Cross talk between the transmitter/receiver pairs is further reduced by mounting sequential transmitters and receivers on opposite sides of the track as described above. Receivers 56,58,62 are responsive to sequential passage of guide wheels 30,32 therepast for generating second electrical signal patterns, which are also fed to PLC 48.

PLC 48 contains signal pattern recognition software that configures the PLC as a fundamental mode asynchronous machine. Through programming and set-up, PLC 48 is able to recognize signal patterns from damaged or missing load and guide wheels, and to trigger an alarm or otherwise provide an operator display at 64 in real time, so as to permit shut-down of the conveyor system before the trolley carrier becomes jammed. The signal pattern recognition programming for configuring PLC 48 as a fundamental mode asynchronous machine in accordance with a presently preferred embodiment of the invention is fully described in Noel et al, "Detection of Defective Carrier Trolleys Utilizing a PLC Realizing A Sequential Finite State Machine For Pattern Recognition," IEEE Publication CH3381-1/93, Aug. 16, 1993, pages 48–51. The disclosure of this paper is incorporated herein by reference for discussion of programming details.

I claim:

1. In a power and free conveyor system that includes a trolley frame having spaced pairs of load wheels supporting the trolley frame for movement in a longitudinal direction along a track and a spaced pair of guide wheels for maintaining orientation of the trolley frame with respect to the track, a system for monitoring the trolley frame load and guide wheels comprising:

a pair of first sensors respectively disposed on opposed sides of the track and responsive to passage of a corresponding pair of load wheels for generating first electrical signal patterns as a function thereof, a plurality of second sensors mounted adjacent to the track and responsive to passage of the pair of guide wheels for generating second electrical signal patterns as a function thereof, and a fundamental mode asynchronous machine coupled to said first and second sensors for performing pattern recognition analysis on said first and second signal patterns to determine operative condition of the load and guide wheels in real time.

* * * * *